Figure 1:
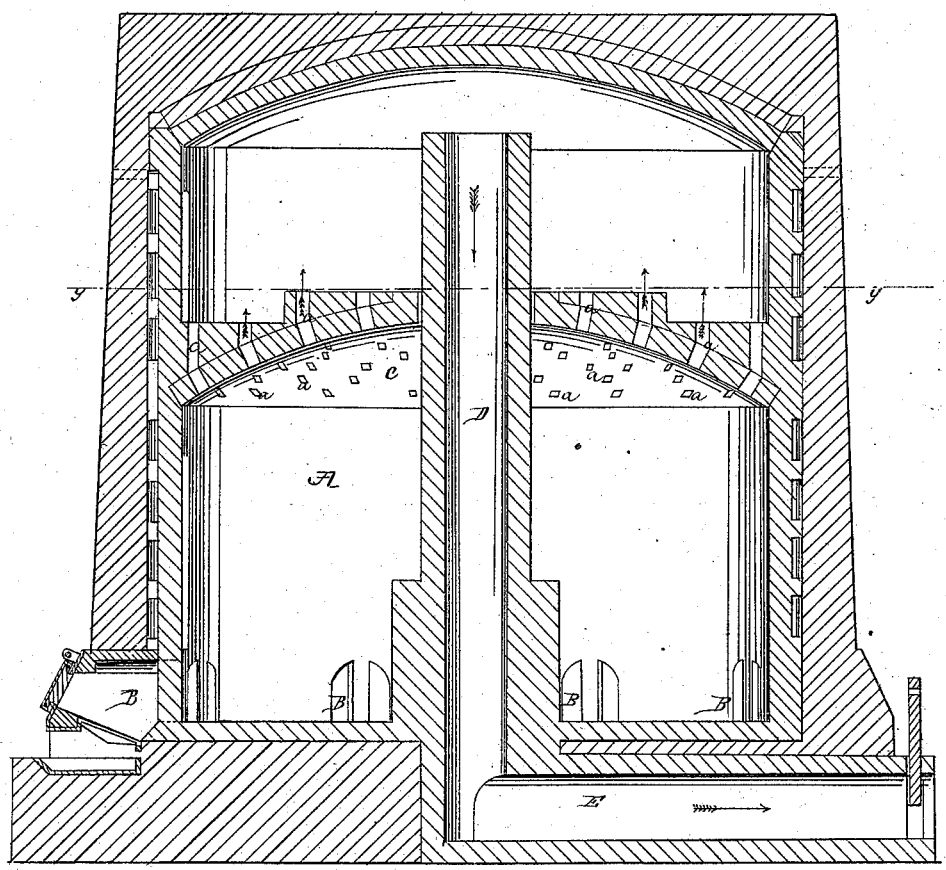

2 Sheets—Sheet 1.

I. N. Stanley
Brick Kiln.

No. 47,665.  Patented May 9, 1865.

Witnesses:  Inventor:
  I. N. Stanly

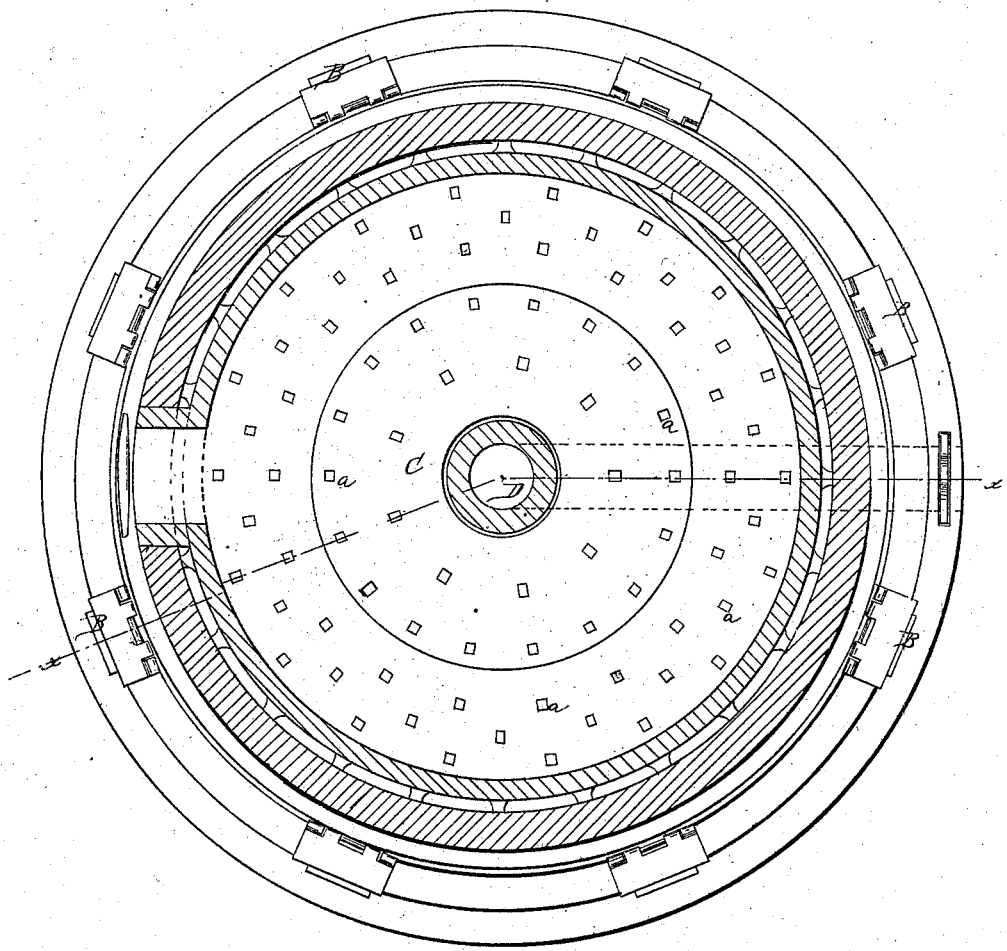

UNITED STATES PATENT OFFICE.

I. N. STANLEY, OF BROOKLYN, NEW YORK.

IMPROVED KILN FOR BURNING BRICK AND POTTERY-WARE.

Specification forming part of Letters Patent No. 47,665, dated May 9, 1865.

*To all whom it may concern:*

Be it known that I, I. N. STANLEY, of Brooklyn, in the county of Kings and State of New York, have invented a new and Improved Kiln for Burning Brick, Pottery-Ware, &c.; and I do hereby declare that the following is a full, clear, and exact description thereof, which will enable those skilled in the art to make and use the same, reference being had to the accompanying drawings, forming part of this specification, in which—

Figure 1, Sheet No. 1, is a vertical section of my invention, taken in the line $x\,x$, Fig. 2. Fig. 2, Sheet No. 2, is a horizontal section of the same, taken in the line $y\,y$, Fig. 1.

Similar letters of reference indicate corresponding parts.

The object of this invention is to economize in fuel in the burning of bricks, pottery-ware, &c., and at the same time cause the whole mass of bricks or other articles placed in the kiln to be burned to be subjected to an uniform degree of heat throughout.

A represents the lower chamber of a brick-kiln, which is represented of circular form in the drawings, but may be of any desired shape. The kiln may be constructed of masonry, as usual, and the chamber A at its lower part or base is encompassed by a series of furnaces, B, placed at equal distances apart all around it, and communicating directly with the chamber A, as shown clearly in Fig. 1.

C is a partition of dome-shape, constructed of masonry, and having a series of perforations, $a$, in it, from near its center to its outer edge or junction with the walls of the kiln. This partition is employed when two chambers are required within the kiln, one above A, for drying or other purposes.

D is a flue, which is placed centrally within the chamber A, and extends up through the center of partition C (see Fig. 1), and has its lower end communicating with a horizontal flue, E, underneath the chamber A, said flue being extended any suitable distance to a smoke-stack.

The bricks or other articles to be burned are stacked up within the chamber A, and in such a manner that the draft or products of combustion may pass up through the entire mass, and through the holes in the partition C, and thence down the flue D into the horizontal flue E to the smoke-stack.

By this arrangement it will be seen that the bricks or other articles placed in the chamber A will be uniformly subjected to heat, for the products of combustion are allowed to pass up from the furnaces directly through the entire mass of articles in A, and thence down flue D, the latter radiating heat at the center of chamber A, where otherwise there would be a deficiency.

I do not confine myself to a single flue, D, for a plurality of them may be used, and in very large kilns more than one may be necessary in order to ensure a uniform distribution of the heat in A.

In practice I design to have the flue E extend underneath a drying-floor, where the pressed bricks are stacked for drying previous to being burned, or it may be utilized in other ways.

I would remark that the perforated partition C is not essential to the carrying out of the invention, for when only one chamber A is required the flue or flues D are built sufficiently high to extend above the articles stacked in A to be burned, and the same result is obtained as when the perforated partition is used.

I claim as new and desire to secure by Letters Patent—

1. The employment, in a kiln for burning brick, pottery-ware, and like articles, of a flue or flues placed centrally, or thereabout, within the burning-chamber of the kiln, and arranged in such a manner that the products of combustion from the furnaces, which are placed around the lower part of the kiln, will pass directly upward through the mass of bricks, pottery-ware, or other articles placed in said burning-chamber, and thence descend through the central flue or flues down to a horizontal flue and through the same to the smoke-stack, 2. A horizontal flue, E, extending to the smoke-stack when said flue is used and made to communicate with one or more vertical or central flues in a kiln, for the purpose of utilizing the heat which passes from said flues.

I. N. STANLEY.

Witnesses:
M. M. LIVINGSTON,
C. L. TOPLIFF.